United States Patent
Goldbach et al.

(10) Patent No.: US 8,244,495 B2
(45) Date of Patent: Aug. 14, 2012

(54) METHOD AND SYSTEM FOR REGION OF INTEREST CALIBRATION PARAMETER ADJUSTMENT OF TRACKING SYSTEMS

(75) Inventors: Günter Goldbach, Wörth/Wilfling (DE); Ingo Wundrich, Munich (DE)

(73) Assignee: Brainlab AG, Feldkirchen (DE)

( * ) Notice: Subject to any disclaimer, the term of this patent is extended or adjusted under 35 U.S.C. 154(b) by 1315 days.

(21) Appl. No.: 11/936,260

(22) Filed: Nov. 7, 2007

(65) Prior Publication Data

US 2008/0136813 A1 Jun. 12, 2008

Related U.S. Application Data

(60) Provisional application No. 60/866,082, filed on Nov. 16, 2006.

(30) Foreign Application Priority Data

Nov. 7, 2006 (EP) .................................. 06023115

(51) Int. Cl.
*G06F 17/00* (2006.01)
(52) U.S. Cl. ....................... 702/150; 382/154
(58) Field of Classification Search ................. 702/150; 382/151
See application file for complete search history.

(56) References Cited

U.S. PATENT DOCUMENTS

| 6,236,896 | B1 | 5/2001 | Watanabe et al. | |
| 6,697,761 | B2* | 2/2004 | Akatsuka et al. | 702/151 |
| 7,697,972 | B2* | 4/2010 | Verard et al. | 600/424 |
| 7,824,328 | B2* | 11/2010 | Gattani et al. | 600/117 |
| 2008/0247621 | A1* | 10/2008 | Zarkh et al. | 382/130 |

FOREIGN PATENT DOCUMENTS

EP    0 963 816 A2    12/1999

OTHER PUBLICATIONS

R.Y. Tsai; "A Versatile Camera Calibration Technique for High-Accuracy 3D Machine Vision Metrology Using Off-the-Shelf TV Cameras and Lenses," IEEE Journal of Robotics and Automation; Aug. 1987.
H. Zhuang et al.; "On Vision-Based Robot Calibration," Robotics Center & Department of Electrical Engineering, Florida Atlantic University; Mar. 29, 1994.

* cited by examiner

*Primary Examiner* — Michael Nghiem
*Assistant Examiner* — Alexander Satanovsky
(74) *Attorney, Agent, or Firm* — Renner, Otto, Boisselle & Sklar, LLP

(57) ABSTRACT

A method for adjusting parameters of a calibration model in a position sensing system including a sensor for obtaining a measurement indicative of a location of an object, the method including: a) providing an initial set of model parameters for determining a relationship between a sensor measurement and a location value within a predetermined volume of location values; b) selecting a plurality of sub-segments of location values within the range of location values; c) providing for each of the selected plurality of sub-segments of location values a local set of model parameters for determining a relationship between a sensor measurement and a location value within the selected sub-segment of location values; d) obtaining a measurement from the sensor; e) determining an estimate of the location of the object from the sensor measurement and the initial set of model parameters; and f) identifying at least one of the selected sub-segments of location values related to the estimate of the location of the object.

19 Claims, 4 Drawing Sheets

METHOD AND SYSTEM FOR REGION OF INTEREST CALIBRATION PARAMETER ADJUSTMENT OF TRACKING SYSTEMS

RELATED APPLICATION DATA

This application claims priority of U.S. Provisional Application No. 60/866,082 filed on Nov. 16, 2006, which is incorporated herein by reference in its entirety.

FIELD OF THE INVENTION

The present invention relates to calibration of position sensing or tracking systems and, more particularly, to a method and apparatus for adjusting calibration parameters in position sensing or tracking systems.

BACKGROUND OF THE INVENTION

Position sensing and/or tracking systems are used to determine a position, orientation and/or shape of an object in three-dimensional space. Position sensing or tracking systems may be employed wherever detection and/or tracking of the position, orientation and/or shape of an object is desired. In position sensing and/or tracking systems the position, orientation and/or shape of an object is continuously determined, thus following or tracking any movement or deformation of the object.

Applications of position sensing or tracking systems include sensing the relative position between a tool and a part to be machined in computer-aided manufacturing (CAM), determining spatial coordinates of points on an object, and tracking and guiding a medical instrument relative to a representation of a body or a body portion in computer-assisted surgery (CAS) or image guided surgery (IGS), for instance. Position sensing or tracking systems typically employ sensors to obtain measurements indicative of a location of an object, e.g., a position and/or orientation of an object in three-dimensional space, or a shape of an object comprising spatial coordinates of distinguished points of an object.

Sensors employed in position sensing or tracking systems may include, for example, sonic or ultrasonic detectors, magnetic detectors, capacitive detectors, radio-frequency and electro-magnetic detectors. The sensors may be cameras that include electro-optical detectors, for instance.

A sensor typically includes, for example, detectors arranged in two-dimensional arrays. In order to determine the location of a particular point in space, multiple sensors, e.g., multiple cameras, or a single sensor in multiple positions and/or orientations, are used. The process of modelling a relationship between sensor measurements, e.g., detector hits, and corresponding spatial locations and/or orientations is called calibration.

Tsai, R. A. "A Versatile Camera Calibration Technique for High-Accuracy 3D Machine Vision Metrology Using Off-the-Shelf TV Cameras and Lenses", IEEE JOURNAL OF ROBOTICS AND AUTOMATION, VOL. RA-3, NO. 4, AUGUST 1987 describes various techniques for camera calibration using model parameters for inferring 3D information from sensor array coordinate measurements, e.g., from a camera image. These techniques involve processes of determining the internal camera geometric characteristics and optical characteristics, termed intrinsic parameters, and/or the spatial position and orientation of the camera frame relative to a predetermined world coordinate system, termed extrinsic parameters. Alternatively, camera calibration may be based on model parameters determining a mathematical (i.e., non-physical) mapping of sensor data to 3D information.

SUMMARY OF THE INVENTION

A method for adjusting parameters of a calibration model in a position sensing or tracking system uses predetermined sets of local calibration parameters to improve an estimate of a location of an object and/or to improve the accuracy of an initial set of calibration parameters. The location of an object may comprise spatial coordinates of distinguished points or landmarks on an object extending in space. Distinguished points or landmarks may be used to determine the shape of an object. A calibration model may be any mathematical or suitably descriptive model that determines a relationship between a sensor measurement or sensor measurements indicative of a location of an object and a location value or location values representing an estimate of the location of the object or the location of distinguished points or landmarks on the object.

Position sensing or tracking systems are well-known and have been described above. A calibration model in a model based position sensing or tracking system generally determines a mapping or transformation from a set of possible measurements obtained from one or more sensors to a set of location values often designated as a location or tracking volume.

A mapping or transformation underlying a calibration model may be represented by a number of equations or equation systems, which in turn may be represented by an ordered set of coefficients or parameters. Hence, it is said that a set of parameters or a "parameter set" determines or represents a calibration model.

An object may be an industrial part in an experimental or productive process or a patient or body portions of a patient in diagnostic, therapeutic, clinical or automatic examination or treatment.

The sensor may comprise an array of optical sensors arranged in a camera, for instance. Cameras may use light or electro-magnetic radiation, for example, in the visible spectrum, but also in infrared or other invisible points of the spectrum. Any sensor that receives emitted or reflected energy, or energy otherwise put forth from an object may be used to obtain position information.

In the case of using reflected energy, an object may itself be reflective. Alternatively, a marker or markers may be used comprising reflective elements, wherein the marker or markers may be attached to the object in a fixed position or relationship. Energy received from a sensor may include sonic energy, electro-magnetic energy or other forms of transmissible energy.

If an array of sensors is used, the location of a particular sensor element or sensor elements within the array of sensors may be considered to be part of a sensor measurement. From an initial pre-calibrated set of model parameters and a measurement obtained from one or more sensors, a position sensing or tracking system known in the art may determine an estimate of the location or shape of an object.

The method described herein may use or be used in a conventional position sensing or tracking system to obtain an estimate of a location or shape of an object from a sensor measurement and initial set of model parameters. The inventive can comprise the steps of:

a) Providing a plurality of local model parameters sets each of which represent a local relationship between one of a plurality of pre-selected restricted segments or sub-segments of location values within the initial location or tracking volume. These model parameter sub-segments can be obtained and stored during calibration of the device and made available in a memory of the tracking system. A preferred way to store the "local" model parameters is a database or a look-up table of model parameters for a predetermined number of volume subsets.

b) Obtaining a measurement of a sensor from a camera including electro-optical detectors, for instance.

c) Determining an estimate of the location and/or orientation of the object from the sensor measurement and the initial set of (global) model parameters comprising a known calibration model.

d) Using the estimate of the location of the object to identify and look up at least two of the selected sub-segments of model parameters related to the estimate of the location of the object. Preferably, these sub-segments of model parameters can be smoothly fit to the neighboring sub-segments to avoid dis-continuities and achieve best estimation results (an exemplary fitting process is described below).

e) Finally the set of model parameters obtained in the fitting step may replace the initial set of model parameters and serve as a basis to obtain an improved estimate of the location of the object.

In a preferred embodiment of the method, the step of selecting a plurality of sub-segments of location values includes selecting the plurality of location sub-segments from location values in sub-segments related to the sensor or from location values in a sub-segment related to the object. The sensor may be a camera and the location sub-segments may be selected from a line emanating from the camera, e.g., the optical axis of the camera.

An apparatus for adjusting parameters of a calibration model in a position sensing system including a sensor for obtaining a measurement indicative of a location of an object comprises:

a device for providing an initial set of model parameters that determine a relationship between a sensor measurement and a location value within a predetermined segment of location values;

a device for selecting a plurality of sub-segments of location values within the segment of location values;

a device for providing for each of the selected plurality of sub-segments of location values a local set of model parameters that determine a relationship between a sensor measurement and a location value within the selected sub-segment of location values;

a device for determining an estimate of the location of the object from a sensor measurement and the initial set of model parameters;

a device for identifying at least two of the selected sub-segments of location values related to the estimate of the location of the object; and a device for smoothly fitting the local sets of model parameters corresponding to the identified at least two selected sub-segments of location values according to the estimate of the location of the object.

A database may include a) a plurality of sub-segments of location values within a predetermined segment of location values, and b) a plurality of local sets of parameters of a calibration model of a position sensing or tracking system. Each set of model parameters determine or can be used to determine a relationship between a sensor measurement in the position sensing system indicative of a location of an object and a location value within a respective sub-segment of the plurality of sub-segments of location values.

The database may be further arranged for identifying at least two location values of the plurality of sub-segments of location values related to a location estimate; and for fitting a set of model parameters to the local set of parameters corresponding to the sub-segments of location values that have been identified according to the estimate of a location of the object.

The method may further be executed by a computer program executed on a general purpose computer, a dedicated computer, a computer on a chip (SOC), dedicated hardware such as an FPGA (field programmable gate array) or a DSP (digital signal processor) or combinations thereof. Further, a computer may be caused by a computer program or a dedicated hardware description, such as VHDL (very high speed integrated circuit hardware description language) code to function as the apparatus. The computer program for executing the method and/or the computer program causing a computer or other dedicated hardware to function according to the apparatus may be stored on a computer-readable data carrier or in a fixed memory such as FLASH memory, EEPROM or other permanent programmable memory devices.

In preferred embodiments of the method, the apparatus, the database or the computer program the location of an object may comprise spatial coordinates or points on a three-dimensional object.

The use of location sensing or tracking systems in many cases, e.g., in medical image guided surgery, may be restricted by certain setup constraints that require operation in a special part of the calibrated tracking volume. This may be due to space requirements in the operating room (OR), the presence of other nearby equipment, or simply the fact that there is no need to work in the complete location or tracking volume. For many image guided surgery (IGS) applications, locating or tracking of instruments within a fairly small location or tracking volume is sufficient since the OR field is typically limited by the patient himself/herself. In ENT operations, for example, the area of interest for the location or tracking system is limited to the area around the head of the patient. Similar situations arise in cranial applications or spinal applications. If other external equipment such as X-ray C-arms or microscopes are used and need to be located or tracked by the location or tracking system, there is typically a need to bring the instruments very close to the OR field to achieve high accuracy and best results.

Therefore it is of benefit for many applications not to use global model parameters for the entire possible working range, but improve accuracy by selecting actually used sub-segments of the possible working range. Restricted ranges or sub-segments of location values may be set up by taking actual marker positions or locations on or of the object within some margin. It is conceivable that restricted ranges or sub-segments of location values representing a particular volume of interest may be predetermined, including for instance the skull, the spine, or the knee of a patient or any other body portions of a patient. It is furthermore possible to automatically select sub-segments based on the initial (rough) estimation of the objects found.

BRIEF DESCRIPTION OF THE DRAWINGS

The forgoing and other features of the invention are hereinafter discussed with reference to the drawing.

DETAILED DESCRIPTION

Figure 1:
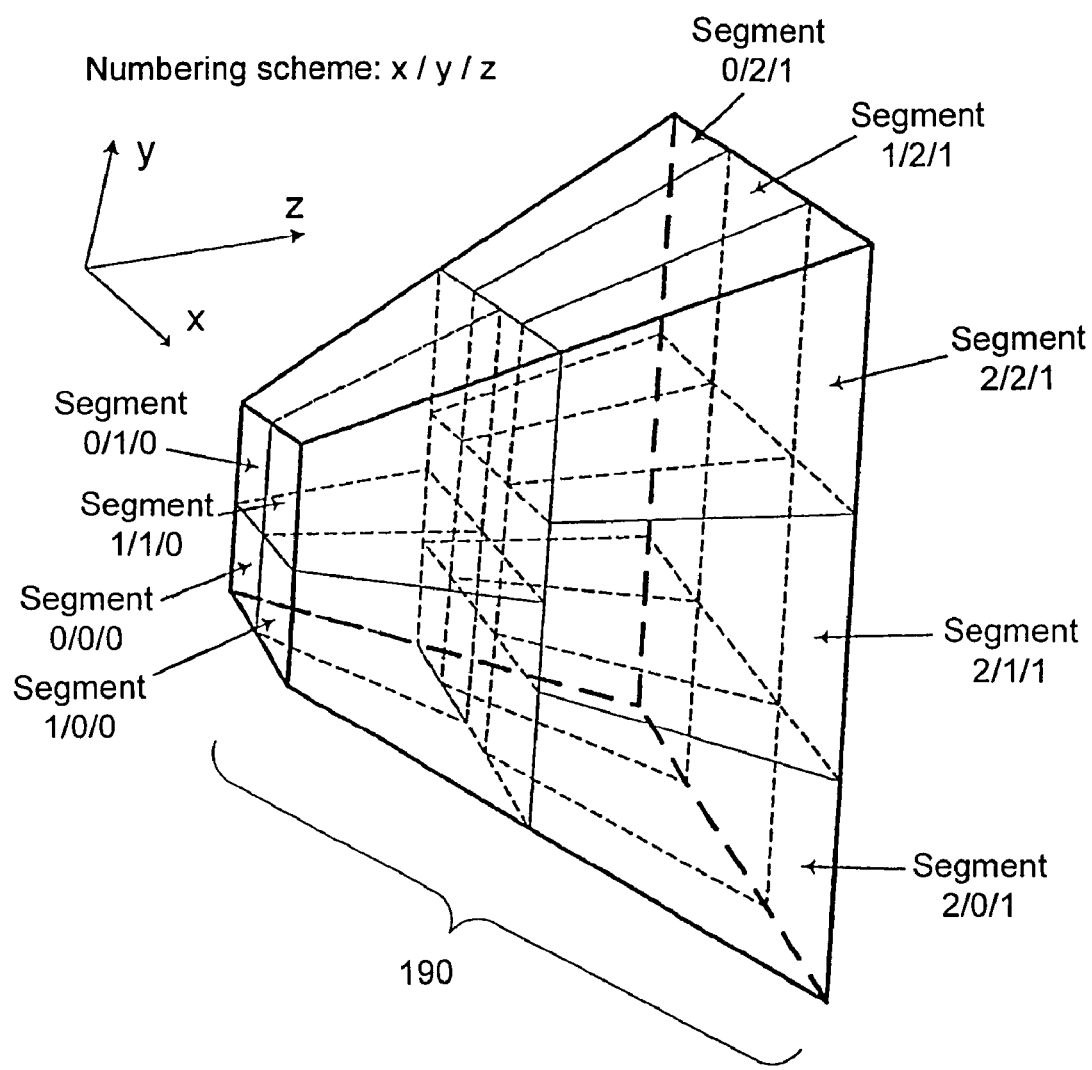
FIG. 1 is a schematic representation of an exemplary tracking volume divided into sub-volumes (referred to as sub-segments herein) in accordance with the invention, wherein the sub-segments have approximately the same size. For each of the segments a parameter set is provided during the calibration process. To simplify the schematics, only 9 of the 13 segments are numbered.

FIG. 1 shows in diagrammatic form a tracking volume, for example, that includes thirteen sub-segments that can be numbered systematically according to their location in three-dimensional space (e.g., according to their X, Y and Z position). A geometrical sub-segmentation can be performed so that sub-segments have approximately the same volume. The pyramid shape in FIG. 1 is related to a viewing volume of typical stereoscopic sensor systems. Other volumes, such as cubic shapes, spherical or cylindrical shapes are possible.

Figure 2:
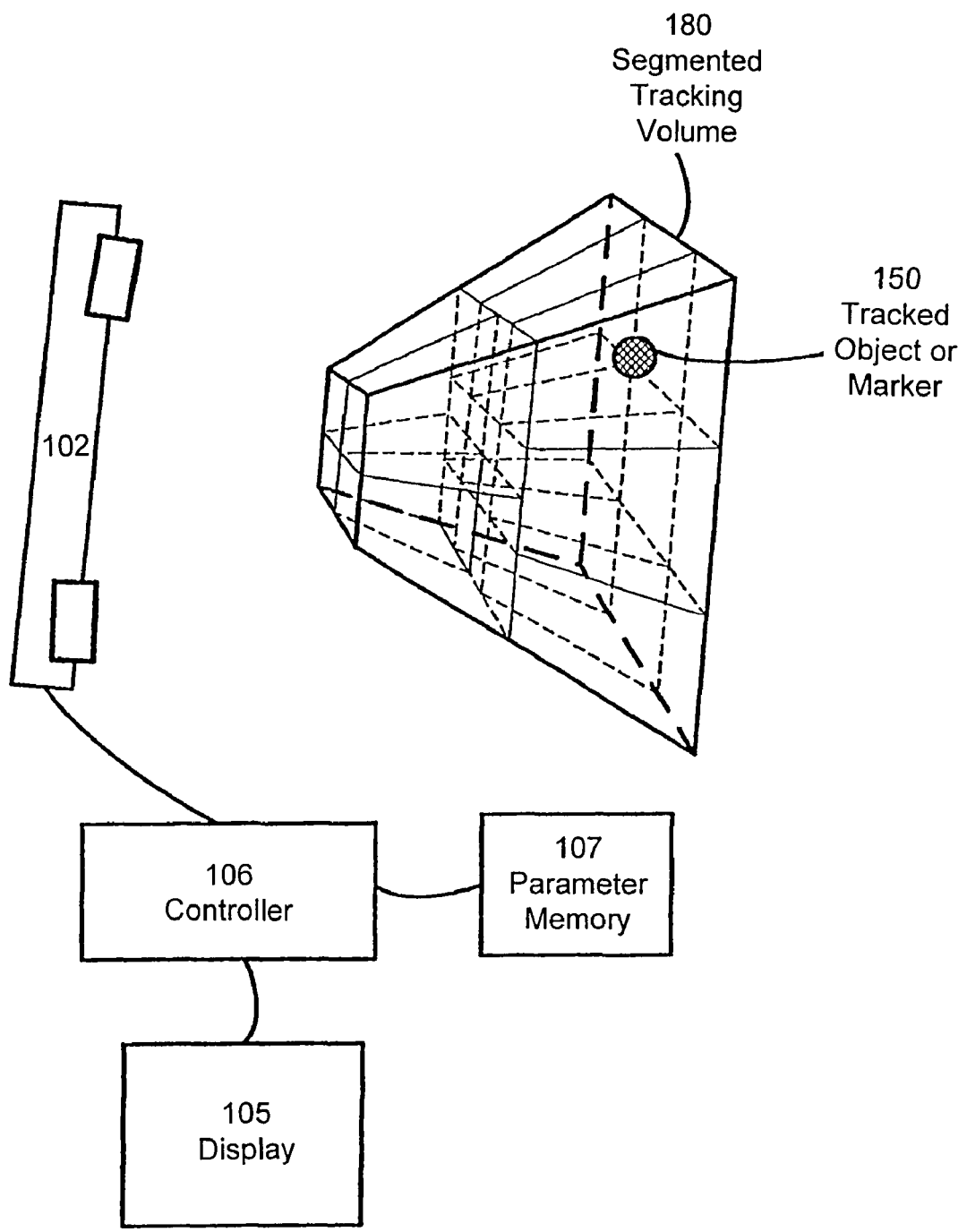
FIG. 2 is a schematic representation of the application of an exemplary method in accordance with the invention for adjusting calibration parameters in a position sensing or tracking system.

FIG. 2 shows in diagrammatic form a tracking volume 190, in which an object 150 can be positioned. A position sensing or tracking system comprising a sensor 102, a controller or data processing device 106 and a memory 107 can determine locations and/or orientations and/or a shape or shapes of the object 150 from measurements obtained from sensor 102. The sensed or tracked locations and/or orientations and/or shapes of the object may be visualized on a display 105 controlled by controller or processing device 106. This can be achieved by using a suitable calibration model, for instance.

Parameters of the calibration model can be held in memory 107 (e.g., in a database or the like) and read into the controller or data processing device 106 upon setup of the position sensing or tracking system. Calibration parameters determine or can be used to determine a relationship between measurements obtained from the sensor 102 and locations or orientations of the object 150, locations on the object 150, and locations or orientations within the object 150, respectively.

Calibration parameters comprise coefficients of equations or equation systems, for instance, representing a physical or mathematical model, a mapping or a transformation that enables the conversion, mapping or transformation of sensor measurements into estimates of location values. Location values can be expressed in coordinates of the tracking volume 190. Typically the coordinate system is aligned perpendicular to one or more of the sensors of the tracking system.

FIG. 1 depicts a series of regular sub-segments designated Segment 0/0/0, Segment 0/1/0, Segment 1/1/0 and so forth according to the numbering scheme previously described. The segments are predetermined sub-sets of the entire tracking volume.

The memory 107 may hold the representations of a number of sub-segment or subspace arrangements. In FIG. 1 there are, for example, thirteen sub-segments. Together with the sub-segment or subspace arrangements, memory 107 may hold sets of model parameters for individual predetermined sub-segments. These parameter sets can be pre-calculated and stored in memory 107, for example.

Once a raw estimate of a location value is determined in a location sensing or tracking system using the initial tracking volume 190 according to FIG. 2 and the corresponding initial model parameters, more accurate estimates of the respective location or orientation or shape of the object 150 can be obtained by using the local parameter set corresponding to the sub-segment that the raw location estimate falls into.

In the example of FIG. 2, a raw location value 150 falls into sub-segment 2/2/1 according to the numbering of FIG. 1. Using the predetermined parameter set of the sub-segment, e.g., of sub-segment 2/2/1, and the original measurement obtained from sensor 102, a more accurate estimate of the respective location on or of the object or the orientation of the object, e.g., expressed in a location or z-value, can be obtained. This improvement of location accuracy can be significantly augmented by fitting a parameter set to multiple location parameter sets in the vicinity of a raw estimate of a location value. An exemplary fitting procedure is schematically demonstrated in FIG. 3.

Parameter sets of a calibration model in a position sensing or tracking system comprise roughly a dozen or more parameters, depending on the desired accuracy. Within the local sets of parameters, each parameter may assume distinct values depending on the respective sub-segment of location values it has been set up for. Segmentation into sub-segments or sub-space arrangements may be different for different parameters. Some parameters may assume a single global value only.

Figure 3:
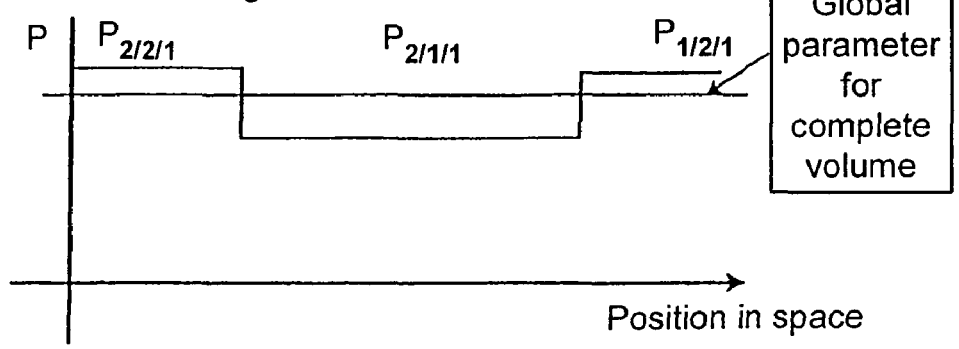
FIG. 3 is a simplified diagrammatic representation of an exemplary parameter fitting process in accordance with the invention for one parameter.
Figure 3:
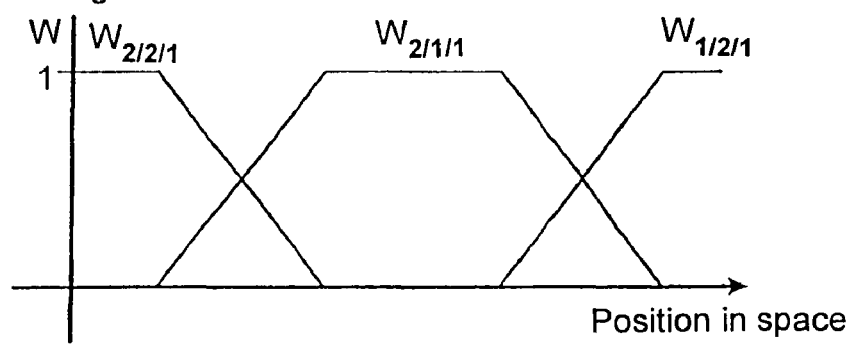
Figure 3:
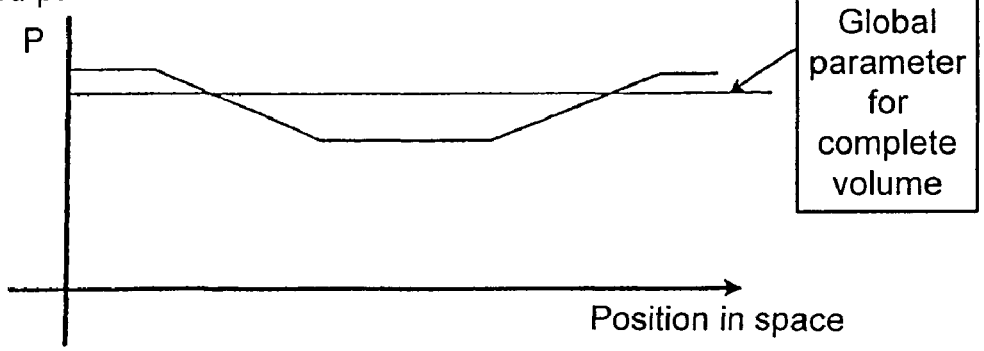

FIG. 3 depicts an example of three distinct parameter values $P_{2/2/1}$, $P_{2/1/1}$ and $P_{1/2/1}$, valid in $S_{2/2/1}$, $S_{2/1/1}$, and $S_{1/2/1}$ respectively, of a parameter P. The parameter values $P_{2/2/1}$ are assumed by the global parameter P in the range of location or shape of the object. In order to find a fitted or adjusted value of parameter P of, for example, a sensor measurement that leads to a raw estimate z* of a location value using an initial parameter set, three sub-segments of location values can be selected, namely $S_{2/1/1}$, which contains z* and $S_{2/2/1}$ and $S_{1/2/1}$ that are close to z*.

In the union $S_{2/2/1} \cup S_{2/1/1} \cup S_{1/2/1}$ of the sub-segments, three weighting functions $w_{2/2/1}$, $w_{2/1/1}$ and $w_{1/2/1}$ may be defined for $z \in P_{2/2/1} \cup P_{2/1/1} \cup P_{1/2/1}$. An example of three weighting functions $w_{2/2/1}$, $w_{2/1/1}$ and $w_{1/2/1}$ is illustrated in FIG. 3. Preferably the weighting function satisfies Equation 1.

$$w_{2/2/1}(z) + w_{2/1/1}(z) + w_{1/2/1}(z) = 1 = \text{const.} \forall z \quad \text{Equation 1}$$

In FIG. 3 this relation is shown as linear (fuzzy) transition. Other functions can be used to optimize the smooth fitting of parameters of adjacent sub-segments.

Now taking a raw location estimate z* into account, a fitted or adjusted value of parameter P can be obtained from Equation 2.

$$P(z^*) = w_{2/2/1}(z^*) P_{2/2/1} + w_{2/1/1}(z^*) P_{2/1/1} + w_{1/2/1}(z^*) P_{1/2/1} \quad \text{Equation 2}$$

Generally a fitted or adjusted parameter P for $z \in S_{xyz}$ can be determined by Equation 3.

$$P(z^*) = \sum_{x,y,z} w_{x/y/z}(z^*) P_{x/y/z}, \quad \text{Equation 3}$$
$$\sum_{x,y,z} w_{x/y/z}(z^*) = 1 \ \forall \ z^* \in \bigcup_{x,y,z} S_{x/y/z}$$

The fitting procedure described above may be applied to each parameter separately or to any combination of parameters in the local parameter sets to obtain a fitted or adjusted parameter set. Of course, more elaborate fitting procedures may be applied, fitting all parameters of a parameter set or a subset thereof to all parameters or a respective subset of parameters, pertaining to selected sub-segments, for instance.

Figure 4:
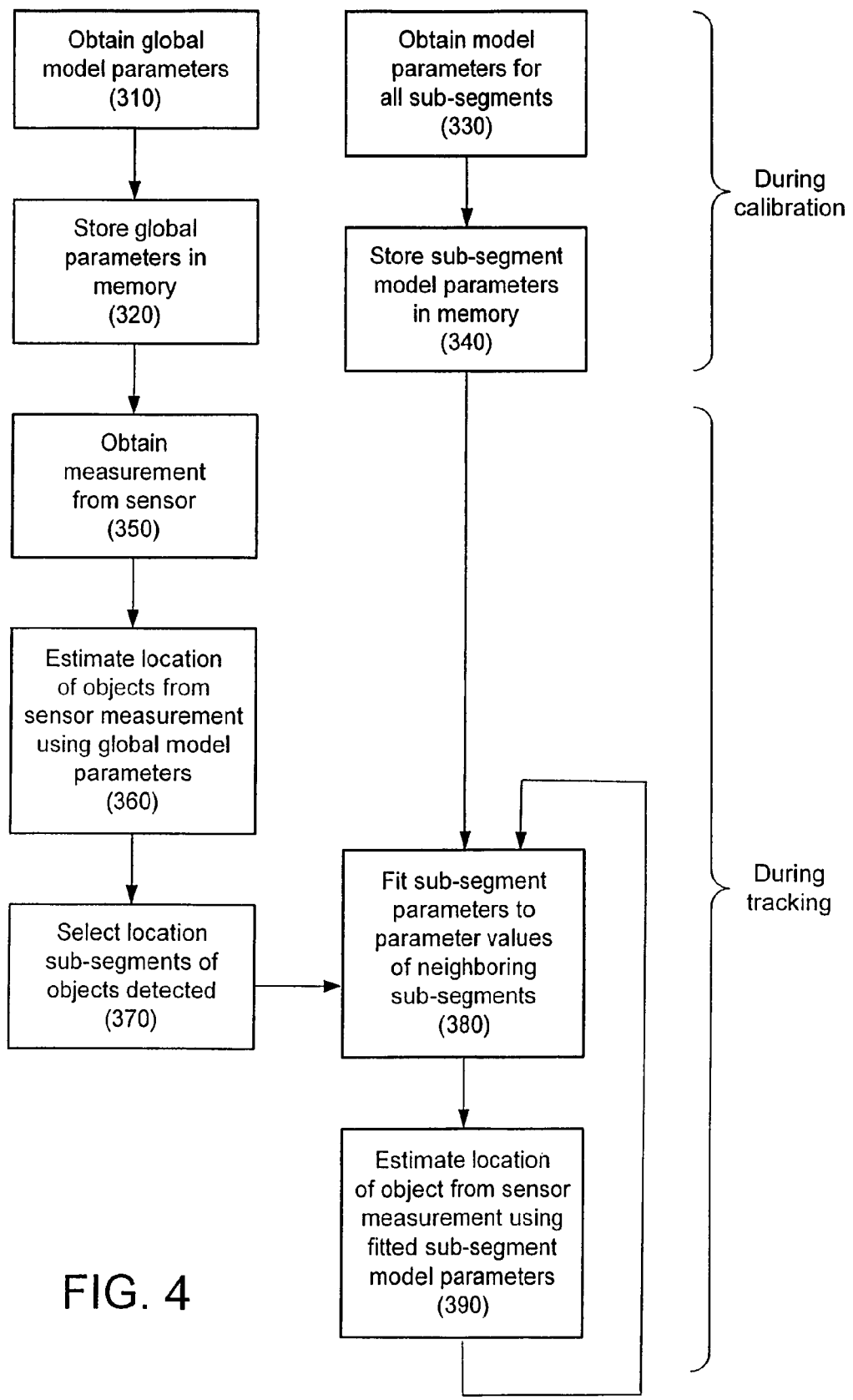
FIG. 4 is a general flowchart of an exemplary method in accordance with the invention.

Referring now to FIG. 4, a flow diagram shows the general principle of the method used to adjust parameters in the position sensing or tracking system shown in FIG. 2. During the calibration of the system, model parameters are obtained for the complete working volume as indicated at step 310. These model parameters determine a relationship between a sensor measurement indicative of a location on or of an object and/or an orientation of an object and a location value within an initial location or tracking volume 190 comprising a predetermined segment of location values. This parameter set can comprise average values for the model parameters. At the same time during calibration of the system, a number of sub-set of parameters for the pre-defined sub-segments are obtained at step 330. Both the global and the sub-segment parameters are stored in memory at steps 320 and 340, respectively.

During operation of the tracking system, a measurement, for example from a sensor of the location sensing or tracking system shown in FIG. 2, is obtained as indicated at step 350. In step 360, an estimate of the location on or of the object can be determined from the sensor measurement and the initial set of model parameters that were obtained in step 310 and stored in memory in step 320.

Based on the first estimation of the position of the object 150, sub-segments of location values of the detected object 150 are selected at step 370 to subdivide and/or restrict the location or tracking volume 190 to a series of smaller location sub-segments (segments $S_{xyz}$ according to FIG. 1), for instance. For each of the selected sub-segments of location values, individual parameters sets are provided from memory, each modeling a relationship between a sensor measurement indicative of a location on or of an object and a location value within the respective sub-segment of location values. In order to adjust the initial set of parameters, two or more of the selected sub-segments of the location values can be identified in relation to the estimated location of the object. This can be a location sub-segment that contains the estimated location of the object and/or one or more location sub-segments that are in the neighborhood of the estimated location of the object.

Taking the calibration parameters pertaining to the identified sub-segments of location values, the model parameters can be fit at step 380 to the model parameters representing the optimum parameters for the estimated object location. This fitting can be performed, for example, by means of the fitting procedure illustrated above with reference to FIG. 3. The fitting step 380 provides an adjusted set of model parameters that replace the initial set of model parameters. The fitted or adjusted sets of initial model parameters can be used at step 390 to obtain an improved estimate of a location of the object.

The improved estimate of a location of the object obtained in step 390 and/or the adjusted set of model parameters obtained in steps 380 can be fed back to steps 380 and 390, respectively, to obtain further improved model parameters and/or location estimates. Preferably, small segments may be subject to additional refinement iterations, i.e. parameters may be fed back to step 380 and/or step 390.

The method, apparatus, and the database can provide improved local accuracy of a location sensing or tracking system within the actually used location or working volume. This can be accomplished by using more accurate subsets of calibration model parameters instead of one single calibration parameter set that needs to be optimized for the entire tracking volume.

The inventive technique may be used for all model based location sensing and tracking systems in a wide variety of applications. Typical applications including ENT or cranial image guided surgery, orthopedic surgery, cardiac surgery or dental applications within medical applications. The invention, however, is not limited to medical applications since similar requirements do exists in metrology applications throughout various industries. This includes automotive assembly and measurement applications, aircraft engineering and other industries where tracking and positioning of objects play vital roles.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for adjusting parameters of a calibration model in a medical position sensing system prior to tracking a medical instrument, the position sensing system including a sensor for obtaining a measurement indicative of a location of an object, the method comprising:
    a) providing an initial set of model parameters for determining a relationship between a sensor measurement and a location value within a predetermined three-dimensional tracking volume of location values;
    b) selecting a plurality of sub-volumes of location values within the range of location values;
    c) providing for each of the selected plurality of sub-volumes of location values a local set of model parameters for determining a relationship between a sensor measurement and a location value within the selected sub-volume of location values;
    d) obtaining a measurement from the sensor;
    e) determining an estimate of the location of the object from the sensor measurement and the initial set of model parameters; and
    f) identifying, using the position sensing system, at least one of the selected sub-volumes of location values related to the estimate of the location of the object.

2. The method according to claim 1, wherein determining an estimate of the location of the object includes smooth fitting model parameters of neighboring sub-volumes based on estimated location of the object.

3. The method according to claim 1, wherein selecting a plurality of sub-volumes of location values within the range of location values includes selecting the plurality of sub-volumes of location values from location values in a sub-volume related to the sensor and/or from location values in a sub-volume related to the object.

4. The method according to claim 1, further comprising using the local set of model parameters corresponding to the identified at least one sub-volume to adjust the initial set of model parameters.

5. The method according to claim 4, further comprising using the adjusted set of model parameters corresponding to the identified at least one sub-volume to further refine the adjusted set of model parameters.

6. The method according to claim 4, further comprising estimating a location of the object based on the adjusted set of model parameters.

7. A method for adjusting parameters of a calibration model in a medical position sensing system prior to tracking a medical instrument, the position sensing system including a sensor for obtaining a measurement indicative of a location of an object, the method comprising:
   identifying an approximate location of the object within a three-dimensional working volume based on a first set of model parameters;
   obtaining a local area set of model parameters based on the approximate location of the object within the three-dimensional working volume; and
   using the local area set of model parameters to recalculate, using the position sensing system, the location of the object within the three-dimensional working volume.

8. The method according to claim 7, wherein identifying includes using a sensor to obtain data corresponding to a location of the object in the working volume, and using the data to estimate the approximate location of the object.

9. The method according to claim 7, wherein the location of the object comprises spatial coordinates of points on a three-dimensional object.

10. An apparatus for adjusting parameters of a calibration model in a medical position sensing system prior to tracking a medical instrument, the position sensing system including a sensor for obtaining a measurement indicative of a location of an object, the apparatus comprising:
    a processor and memory;
       logic stored in the memory and executable by the processor, said logic including
       logic that provides an initial set of model parameters for determining a relationship between a sensor measurement and a location value within a predetermined three-dimensional tracking volume of location values;
       logic that selects one or more sub-volumes of location values within the range of location values;
       logic that provides for each of the selected sub-volumes of location values a local set of model parameters for determining a relationship between a sensor measurement and a location value within the selected sub-volume of location values;
       logic that determines an estimate of the location of the object from a sensor measurement and the initial set of model parameters;
       logic that identifies at least one of the selected sub-volumes of location values related to the estimate of the location of the object.

11. The apparatus according to claim 10, further comprising logic that fits the initial set of model parameters to local sets of model parameters corresponding to the identified at least one of the selected sub-volumes of location values according to the estimate of the location of the object.

12. The apparatus according to claim 10, wherein the logic that selects one or more sub-volumes of location values within the range of location values includes logic that selects the plurality of sub-volumes of location values from location values in a sub-volume related to the sensor and/or from location values in a sub-volume related to the object.

13. The apparatus according to claim 10, further comprising logic that uses the local set of model parameters corresponding to the identified at least one sub-volume to adjust the initial set of model parameters.

14. The apparatus according to claim 13, further comprising logic that estimates a location of the object based on the adjusted set of model parameters.

15. The apparatus according to claim 10, wherein the location of the object comprises spatial coordinates of points on a three-dimensional object.

16. A non-transitory computer-readable medium encoded with a data structure, comprising:
    a first data group for storing a plurality of sub-volumes of location values within a predetermined range of location values, the location values being within a predetermined three-dimensional tracking volume of location values; and
    a second data group for storing a plurality of local sets of parameters of a calibration model of a medical position sensing system prior to tracking a medical instrument, each local set of parameters identifying a relationship between a sensor measurement in the medical position sensing system indicative of a location of an object and a location value within a respective sub-volume of the plurality of sub-volumes of location values,
    wherein the data structure enables
       identification of at least one location value of the plurality of sub-volumes of location values related to an estimate of a location of the object, and
       fitment of a set of model parameters to local sets of parameters corresponding to the identifiable at least one sub-volume of location values according to the estimate of a location of the object.

17. The non-transitory computer-readable medium according to claim 16, wherein the location of the object comprises spatial coordinates of points on a three-dimensional object.

18. A non-transitory computer readable medium encoded with a computer program product for adjusting parameters of a calibration model in a medical position sensing system prior to tracking a medical instrument, the position sensing system including that includes a sensor for obtaining a measurement indicative of a location of an object, the computer program comprising:
    a) code that provides an initial set of model parameters for determining a relationship between a sensor measurement and a location value within a predetermined three-dimensional tracking volume of location values;
    b) code that selects a plurality of sub-volumes of location values within the range of location values;
    c) code that provides for each of the selected plurality of sub-volumes of location values a local set of model parameters for determining a relationship between a sensor measurement and a location value within the selected sub-volume of location values;
    d) code that obtains a measurement from the sensor;
    e) code that determines an estimate of the location of the object from the sensor measurement and the initial set of model parameters; and
    f) identifying at least one of the selected sub-volumes of location values related to the estimate of the location of the object.

19. The non-transitory computer readable medium according to claim 18, wherein the location of the object comprises spatial coordinates of points on a three-dimensional object.

* * * * *